(No Model.)
C. A. STODDARD.
ROLLER SKATE.
No. 288,508. Patented Nov. 13, 1883.
Fig. 1.
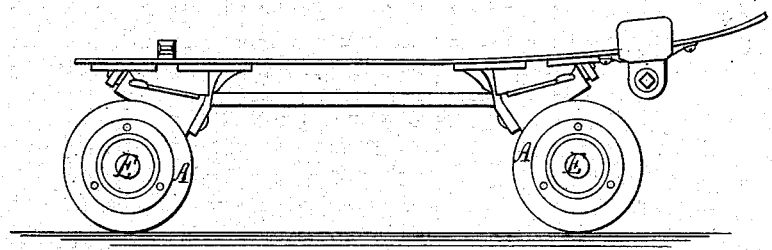
Fig. 2.  Fig. 3.
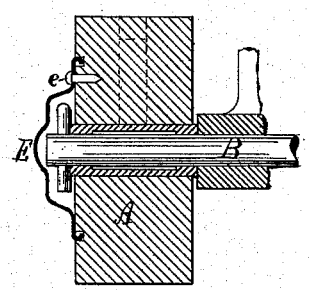 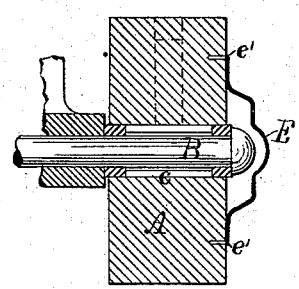
Fig. 4.
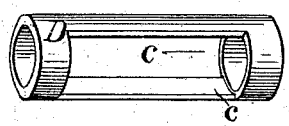
Fig. 5.  Fig. 6.
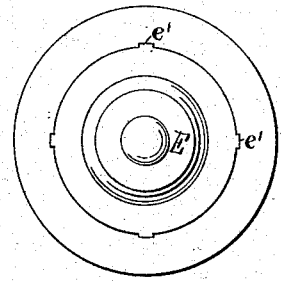 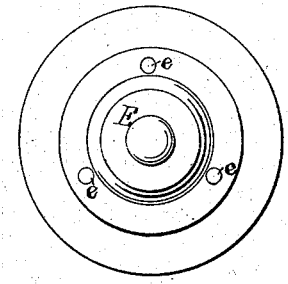
WITNESSES:
C. H. Luther Jr.
Wm. L. Coop.
INVENTOR:
Charles A. Stoddard
by Joseph A. Miller & Co
Att'ys

UNITED STATES PATENT OFFICE.

CHARLES A. STODDARD, OF PROVIDENCE, RHODE ISLAND.

ROLLER-SKATE.

SPECIFICATION forming part of Letters Patent No. 288,508, dated November 13, 1883.

Application filed January 22, 1883. (No model.)

*To all whom it may concern:*

Be it known that I, CHARLES A. STODDARD, of the city and county of Providence and State of Rhode Island, have invented a new and useful Improvement in Roller-Skates; and I hereby declare the following to be a full, clear, and exact description of the same, reference being had to the accompanying drawings, forming part of this specification.

This invention has reference to an improvement in the axle-bearings of the rollers of skates, and in the means for lubricating the same.

The invention consists in providing the bearing in the rollers with one or more chambers, and in protecting the outer side of the rollers with a shield, so as to prevent the loss of oil and soiling of garments, as will be more fully set forth hereinafter.

In roller-skates it is important that the bearings of the rollers shall be well lubricated, so as to make them turn with the least possible frictional resistance. In use, when the rollers are rapidly revolving, the centrifugal force throws the oil outward on the sides of the rollers, and usually more oil is so thrown outward on the outside of the rollers than on the inner side. The oil so thrown out not only causes waste of oil and necessitates repeated oiling, but the garments of the skaters are injured by this oil.

The object of this invention is to avoid the loss of oil and injury to the clothing, and for this purpose I form cavities in the bearing of the rollers, into which the oil is drawn by the centrifugal force, and thus prevented from escaping at the ends of the bearings, and I also protect the outside of the roller by means of a shield, so that no oil can escape from the bearing.

Figure 1 is a side view of a skate the rollers of which are provided with my protector-shields. Fig. 2 is a sectional view of a roller provided with a bushing and the shield. Fig. 3 is a sectional view of a roller provided with a bushing and a shield. Fig. 4 is a perspective view of my improved bushing. Fig. 5 is a view of a roller provided with a shield, and Fig. 6 is a view of a roller provided with a shield secured with nails or screws.

In the drawings, A A are the rollers of a roller-skate.

B B are the axles.

C C are the internal cavities. These cavities may be formed by cutting away a portion of the tube forming the bushing, as is shown in Fig. 4; or a central cavity may be formed in the bearing of the roller, so that no bushing is required; or a hole may be bored into the roller and plugged up at the thread or periphery, so as to form a cavity, into which the oil can be drawn by centrifugal force when the roller is rotating, and from which the bearing will receive oil whenever the motion is slow or arrested. It is obvious that, if desired, two or more such holes can be made in the roller. The holes are indicated in Figs. 2 and 3 in broken lines.

D is a metal bushing formed out of a tube, having two pieces, C C, cut away in the center to form cavities for the reception of the oil. These cavities may be filled with some absorbent material; but they will answer their purpose fully without such filling. As shown in Figs. 2 and 3, the bushing bears at the ends only on the axle, so that the surface in contact is small. These bushings may be readily renewed when worn, and the life of the rollers materially extended. An important improvement consists in the fact that the rollers wear, when not bushed, rapidly endwise, and washers have to be used, while the metal bushings wear but little endwise, and can be cheaply renewed when worn, thereby keeping the rollers of a roller-skate always in their true position—a fact appreciated by fancy skaters.

To prevent any oil that may escape on the outside of the roller from soiling the garments, I secure the cap E, made of metal or other suitable material, to the outside of the roller, either by screws, nails, by points forming part of the cap, or in any other suitable manner. The cap E is dished, so as to allow the end of the axle and pin for holding the roller to be covered by the cap and not be in contact with the same.

*e e* are nails or screws by which the cap is secured, and *e′ e′* are points formed with the cap and forced into the wood of the rollers. As the rollers are usually of lignum-vitæ or box-wood, a groove can be undercut into the sides, and the cap E, of light metal, sprung into the same, and the cap thus rigidly secured.

To prevent the escape of oil at the junction of the cap or shield E with the roller, I turn a groove into the face of the roller and form the cap or shield with a flange, which enters the groove, so as to make a tight joint, through which no oil can be drawn by the centrifugal force of the rotating roller, thus forming an oil-reservoir.

When the bearing is formed in the wood of the roller without any metal bushing, a metal ring may be secured on the faces of the roller, so as to guard against the lateral wear of the wooden roller against the bearings, as it is important to prevent such lateral wear, by which the rollers are placed out of line by the unequal wearing of the wood of the several rollers.

Having thus described my invention, I claim as new and desire to secure by Letters Patent—

1. The combination, with the roller A of a roller-skate, provided with a groove on its outer face, of the shield E, provided with a flange at its outer edge, constructed to enter the groove and make an oil-tight joint, as described.

2. The combination, with the roller of a roller-skate, of a metal bushing having a bearing near the ends only, as described.

3. In a roller-skate, the combination, with the fixed axle B and the roller A, of the metal bushing D, forming the bearings on the axle at the ends only, and the shield E, constructed to retain the oil when the skate is in use, as described.

CHARLES A. STODDARD.

Witnesses:
JOSEPH A. MILLER,
M. F. BLIGH.